United States Patent
Davis (10) Patent No.: US 8,544,204 B2
(45) Date of Patent: Oct. 1, 2013

(54) WACKY WORM

(75) Inventor: Danny Davis, Stockton, CA (US)

(73) Assignee: Danny Davis, Stockton, CA (US)

( * ) Notice: Subject to any disclaimer, the term of this patent is extended or adjusted under 35 U.S.C. 154(b) by 340 days.

(21) Appl. No.: 12/829,756

(22) Filed: Jul. 2, 2010

(65) Prior Publication Data

US 2012/0000113 A1    Jan. 5, 2012

(51) Int. Cl.
*A01K 85/00*   (2006.01)
(52) U.S. Cl.
USPC ........................ 43/42.24; 43/42.26
(58) Field of Classification Search
USPC .................. 43/42.24, 42.26, 42.28
See application file for complete search history.

(56) References Cited

U.S. PATENT DOCUMENTS

| | | | | |
|---|---|---|---|---|
| 1,183,527 A * | 5/1916 | Blodgett | | 43/42.24 |
| 2,450,988 A * | 10/1948 | Putnam et al. | | 43/42.24 |
| 2,979,850 A * | 4/1961 | Lund | | 43/42.24 |
| 3,158,952 A * | 12/1964 | Creme | | 43/42.24 |
| D203,509 S * | 1/1966 | Marino | | D22/127 |
| 3,349,513 A * | 10/1967 | Jeff | | 43/42.24 |
| D216,881 S * | 3/1970 | Lingle | | D22/126 |
| D222,585 S * | 11/1971 | Smithwick | | D22/127 |
| D230,976 S * | 3/1974 | Reynolds, Jr. | | D22/127 |
| D237,492 S * | 11/1975 | Zimmerman | | 43/42.24 |
| 3,940,869 A * | 3/1976 | Roberts | | 43/42.24 |
| D239,447 S * | 4/1976 | Radcliff | | 43/42.26 |
| D241,746 S * | 10/1976 | Bain | | D22/127 |
| 3,983,656 A * | 10/1976 | Bain | | 43/42.24 |
| 4,047,318 A * | 9/1977 | Mapp | | 43/42.24 |
| 4,312,148 A * | 1/1982 | Hardwicke, III | | 43/42.24 |
| 4,316,343 A * | 2/1982 | Creme | | 43/42.24 |
| 4,468,881 A * | 9/1984 | Gordon, III | | 43/42.28 |
| 4,530,179 A * | 7/1985 | Larew | | 43/42.24 |
| 4,619,069 A * | 10/1986 | Strickland | | 43/42.26 |
| 4,790,100 A * | 12/1988 | Green, Sr. | | 43/42.26 |
| 4,799,329 A * | 1/1989 | Paulsen | | 43/42.28 |
| D301,730 S * | 6/1989 | Morris | | D22/127 |
| 4,912,871 A * | 4/1990 | Brady | | 43/42.26 |
| 4,993,183 A * | 2/1991 | Carver | | 43/42.24 |
| D316,289 S * | 4/1991 | Smith | | D22/127 |
| D336,324 S * | 6/1993 | Wood | | D22/127 |
| 5,353,540 A * | 10/1994 | Ward | | 43/42.24 |
| 5,490,344 A * | 2/1996 | Bussiere | | 43/42.24 |
| 5,625,975 A * | 5/1997 | Imes | | 43/42.24 |
| 5,822,913 A * | 10/1998 | Lau | | 43/42.26 |
| 5,894,692 A * | 4/1999 | Firmin | | 43/42.24 |
| 5,934,008 A * | 8/1999 | Rice | | 43/42.26 |
| D430,640 S * | 9/2000 | Saverino | | D22/127 |
| D438,590 S * | 3/2001 | Saverino | | D22/127 |
| 6,226,918 B1 * | 5/2001 | Rigney | | 43/42.24 |
| D452,548 S * | 12/2001 | Bambacigno | | D22/126 |
| 6,564,499 B1 * | 5/2003 | Firmin | | 43/42.26 |
| 6,753,004 B2 * | 6/2004 | Ollis et al. | | 43/42.24 |
| 6,775,944 B1 * | 8/2004 | Jones, Jr. | | 43/42.24 |
| D500,832 S * | 1/2005 | Richardson et al. | | D22/127 |
| 7,114,285 B1 * | 10/2006 | Ince | | 43/42.26 |

(Continued)

OTHER PUBLICATIONS

Abstract of web pages for Bio Thumpin Worm Size and Bass Assassin K.O. Assassin Lure.

*Primary Examiner* — Darren W Ark
(74) *Attorney, Agent, or Firm* — Davidson, Davidson & Kappel, LLC (57) ABSTRACT

The present invention is directed to an improved, modifiable wacky worm fishing lure.

16 Claims, 4 Drawing Sheets

(56) References Cited

U.S. PATENT DOCUMENTS

| | | | |
|---|---|---|---|
| 7,266,922 B2 * | 9/2007 | Oelerich et al. | 43/42.24 |
| 7,272,910 B2 * | 9/2007 | Mell | 43/42.26 |
| D604,796 S * | 11/2009 | Wyatt | D22/127 |
| D615,147 S * | 5/2010 | Montgomery | D22/127 |
| 7,845,107 B1 * | 12/2010 | Mell | 43/42.24 |
| 8,037,635 B1 * | 10/2011 | Wyatt | 43/42.24 |
| 8,079,173 B2 * | 12/2011 | Corbitt, III | 43/42.24 |
| 2006/0162232 A1 * | 7/2006 | Allen | 43/42.36 |
| 2007/0261289 A1 * | 11/2007 | Hobbins | 43/42.24 |
| 2010/0050497 A1 * | 3/2010 | Brown | 43/42.24 |

* cited by examiner

WACKY WORM

FIELD OF THE INVENTION

The present invention is related to plastic worm-like lures employed in fishing that are utilized to attract fish and, in particular, to an improved, modifiable, wacky worm for wacky style fishing and for use in various other fishing techniques.

BACKGROUND OF THE INVENTION

The recreational fishing industry consists of enterprises such as the manufacture and retailing of fishing tackle and has become a multi-billion dollar industry. Whether an angler is a saltwater or freshwater aficionado (or both), he or she has a multitude of tackle and equipment options to chose from before venturing out in pursuit of his or her favorite quarry. This is particularly true when it comes to the bass fishing industry. Bass fishing is by far America's number one freshwater sport. Men, women, and children of all ages throughout the country can spend countless hours, not to mention dollars, fishing for this species of fish. Bass fishing popularity has grown exponentially over the years with the introduction of professional tournament circuits and their broadcast on national television networks. This growth in popularity has lead to a boom in the bass fishing industry as manufacturers continuously design and manufacture new baits to stay ahead of their competition. This is especially true in the area of soft plastic baits.

While plastic artificial baits have taken on many shapes and forms, including those resembling living creatures, by far such baits intended to simulate a worm or worm-like creature have been the most successful and longest lived. The original artificial worm was reportedly manufactured by Nick Crème in 1949. This was a standard straight tailed worm, but it spawned generations of worm companies and hundreds of soft plastic lure designs that are the mainstay of modern bass fishing.

Traditionally, such plastic worms are most often rigged to appear as if they are swimming or otherwise moving through the water in a straight line. However, in another age-old style or method of fishing that has taken on increasing popularity in recent years, the angler impales a single hook of some type, e.g., circle hook, through the center or middle portion of an elongated worm-like bait. The purpose of this, often referred to as "wacky worming", is to give the bait a natural slow falling look or presentation in the water while also allowing its outer ends to droop and dangle or otherwise move about simulating the action of a live worm wiggling around on the end of a hook. This wacky-worm style of fishing mainly relies on the movement rather than the visual realisms to attract fish and, it also provides the angler with the ability to present a lure to certain types of heavy cover while remaining weedless.

One of the most popular soft plastic baits utilized for wacky-worming is a straight-bodied stick bait such as the Yamamoto Senko. Designed back in the early 1990s by Gary Yamamoto, this "do nothing" round-bodied, plastic worm-like bait contains a large amount of salt impregnated in the body of the bait that helps impart a slow, horizontal fall with a tantalizing side to side tail action.

As word of the effectiveness of wacky worming a straight-bodied stick bait for catching bass spread amongst the industry, competitors began making similar style baits with minor modifications.

Today an angler can purchase these stick baits with appendages contained on both ends of the stick bait for added vibration and fish attracting capabilities. For example, Big Bite Baits, Inc., Eufala, Ala., manufactures the "Thumpin Worm" which features a straight-bodied stick bait with a paddle on each end that allows for it to be fished several different ways. Rigged wacky-worm style the paddles on both ends create a wobble on the fall. Another similar bait, the K.O Assassin, manufactured by Bass Assassin Lures, Inc., Mayo Fla., features a ribbed, straight-bodied stick bait with serpent-shaped tails on both ends for providing additional vibration and fish attracting capabilities.

While the effectiveness of the plastic stick-bait for catching bass is well known and documented, current baits on the market are not without faults. Most often, these stick baits are manufactured utilizing very soft plastic materials to further provide a stick bait with tantalizing vibration and fish attracting capabilities. However, utilization of these very soft plastic materials also makes for a bait that tears easily, causing loss of the bait off the hook, lost fish and the need for an angler to own many packages of these baits just to make it through a day or season on the water, which ultimately costs an angler more money, both in potential tournament winnings from lost fish and from the need to purchase an abundance of baits.

One way the industry has attempted to solve this problem was with the development of plastic baits utilizing various elastomeric polymers that provide for greater stretch and tear-resistant capabilities. However, these elastomeric type baits generally cost more money and, therefore, do not necessarily solve the problem of reducing costs to an angler.

SUMMARY OF THE INVENTION

While modifications continue to be made in the industry to the straight-bodied stick bait for wacky worming, there still remains a need for an improved wacky-worm. Specifically, a need has long existed for a soft-bodied, worm-like plastic bait that can be modified such that one single bait can be fished wacky-style, yet modified to provide variations of the bait for further wacky-style worming as well as for use in numerous other fishing techniques. Advantages of a soft-bodied, modifiable wacky worm of the present invention include providing a bait that can be modified to accommodate various fishing techniques while reducing costs to the angler by virtue of the angler being able to modify the bait in such a way as to provide variations of the bait suitable for other fishing techniques. This ultimately reduces the amount of money an angler has to spend on tackle because the bait of the present invention can satisfy multiple needs. The present invention has been designed to meet these needs.

It is an object of the present invention to provide an improved, modifiable wacky worm for wacky style fishing and for use in various other fishing techniques.

It is another object of the present invention to provide a method for manufacturing an improved, modifiable wacky worm of the present invention.

It is yet another object of the present invention to provide an improved, modifiable wacky worm that provides the angler with a cost benefit as compared to utilization of other art known baits.

In accordance with the above objects, the present invention is directed to an improved, modifiable, wacky worm that can be modified in a manner such that the modified portions of the bait can be utilized for further wacky-style worm techniques as well as for various other fishing techniques such as, but not limited to, texas rigging, drop shotting, split shotting, Carolina rigging, dead sticking, shaky head fishing, and flick shaking.

In certain embodiments, the present invention is directed to a modifiable, worm-like, polymer fishing lure for wacky worming, comprising: a one-piece, integrally-molded, polymer fishing lure body comprising a midsection having a first and second end, opposing first and second tail ends, wherein the first tail end is interconnected to the first end of the midsection at a first cutting area and the second tail end is interconnected to the second end of the midsection at a second cutting area, the first and second cutting areas providing designated locations for modifying the body of the lure. The opposing tail ends can be any type of tail utilized in the bait manufacturing industry. For example, the tail ends may be a curly tail, a ribbon tail, a sickle tail, a paddle tail a twin tail, combinations thereof and the like.

The fishing lure body can be modified such that one or both of the tail ends can be removed to provide: i) two separate polymer fishing lure bodies; or ii) three separate polymer fishing lure bodies, wherein each of said polymer fishing lure bodies, whether modified or interconnected can be fished utilizing the same or different angling techniques.

In certain other embodiments, when the wacky worm of the present invention is modified such that one or both tail sections are removed from the midsection of the bait, the tail sections can further be utilized as trailers for jigs, buzzbaits, spinner baits and the like. The tail sections can also be utilized with various terminal tackle such as, but not limited to, jig heads (round ball, darter-head, football head, etc.) and the like. The remaining straight-bodied section of the bait can be further utilized for wacky-style fishing as well as for any of the above-mentioned fishing techniques.

Ultimately, the modifiable, worm-like, polymer fishing lure of the present invention provides a bait wherein all sections (parts) of the bait can be utilized even after the bait has been once or twice modified, thus eliminating waste and decreasing costs to the angler.

DETAILED DESCRIPTION OF THE PREFERRED EMBODIMENTS

Before explaining the present invention in detail, it is to be understood that the invention is not limited to the particular embodiments and that it can be practiced or carried out in various ways.

Figure 1:
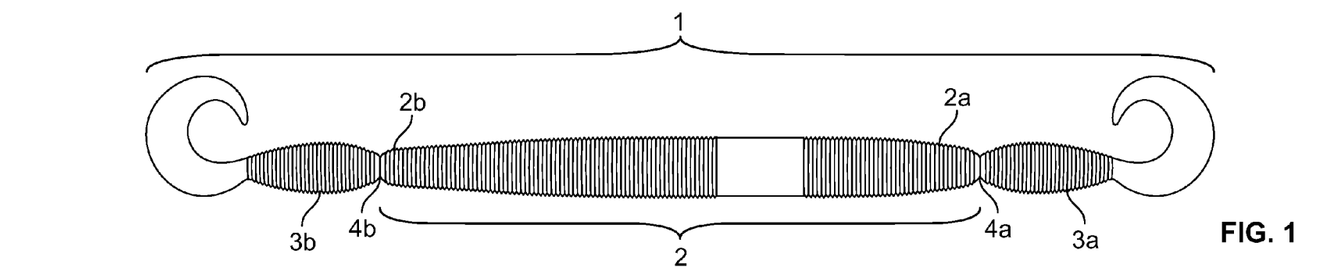
FIG. 1 shows a modifiable, worm-like fishing lure of the present invention that is unmodified.
Figure 2:
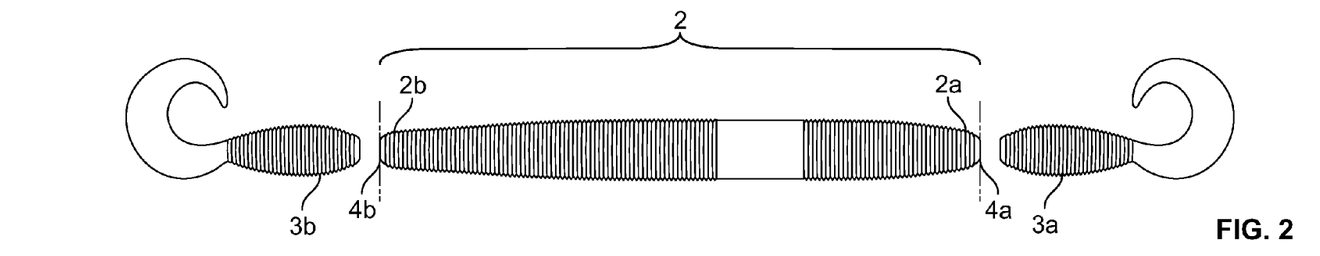
FIG. 2 shows a modifiable, worm-like fishing lure of the present invention that has been modified by removal of both tail ends.
Figure 3:
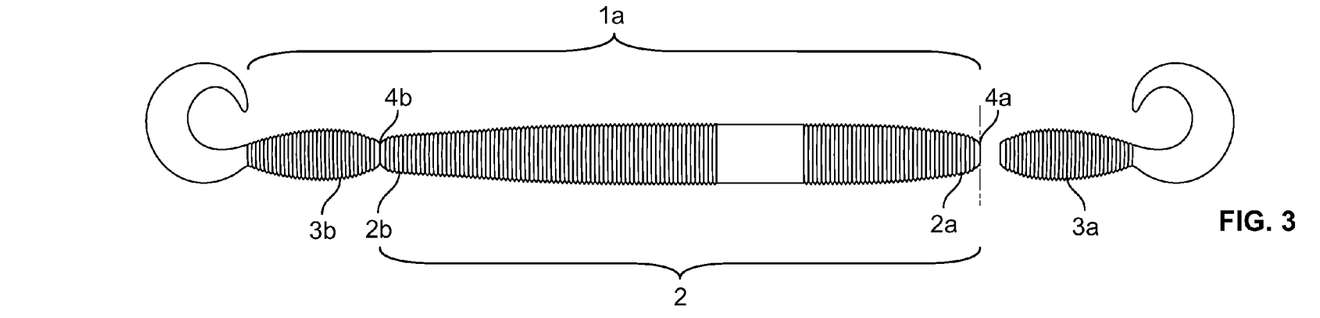
FIG. 3 shows a modifiable, worm-like fishing lure of the present invention that is has been modified by removal of one tail end.
Figure 5A:
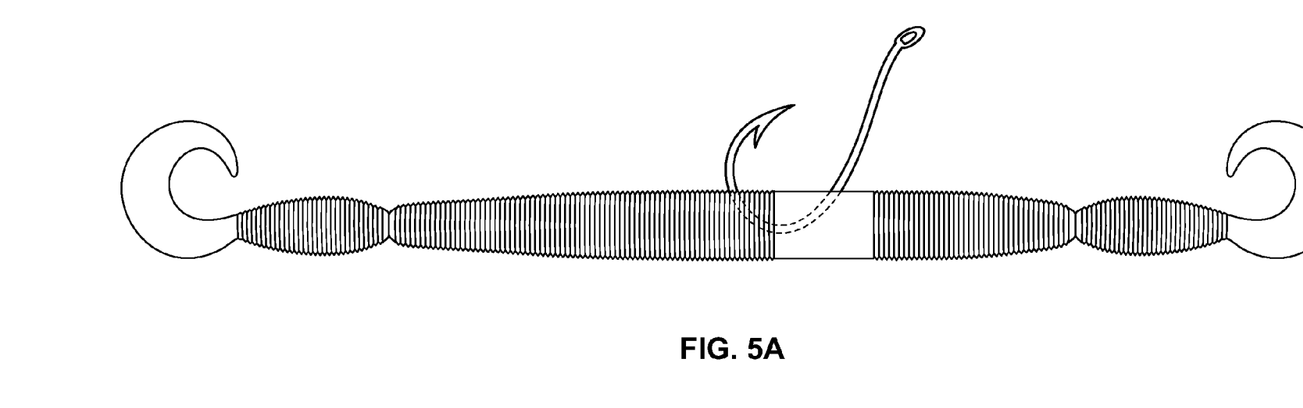
FIG. 5a shows a rigged modifiable, worm-like fishing lure of the present invention that is unmodified, the unmodified lure being rigged wacky style.
Figure 5B:
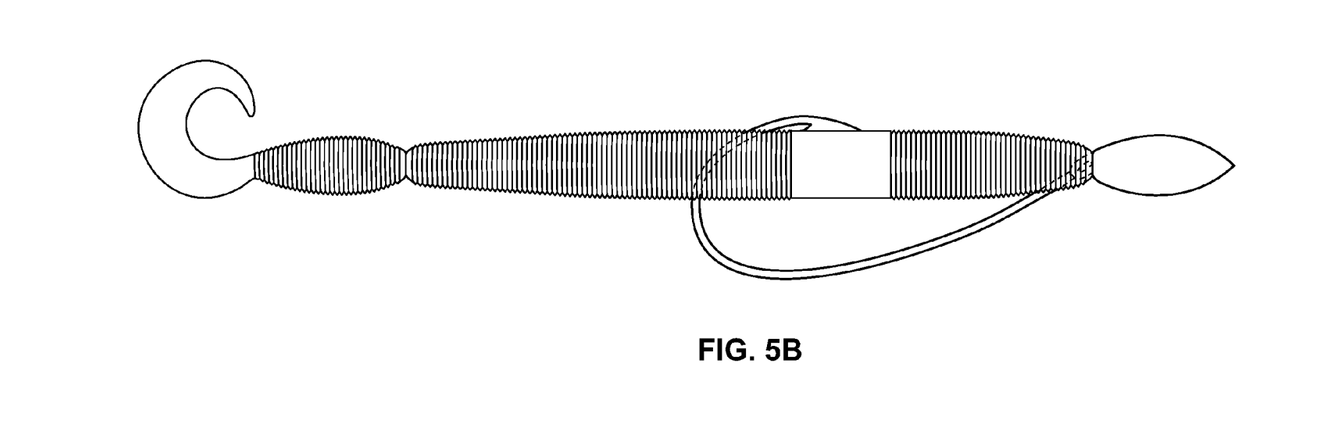
FIG. 5b shows a rigged modifiable, worm-like fishing lure of the present invention that has been once modified by removal of one tail end, the once modified lure being texas rigged with a hook and bullet weight.
Figure 5C:
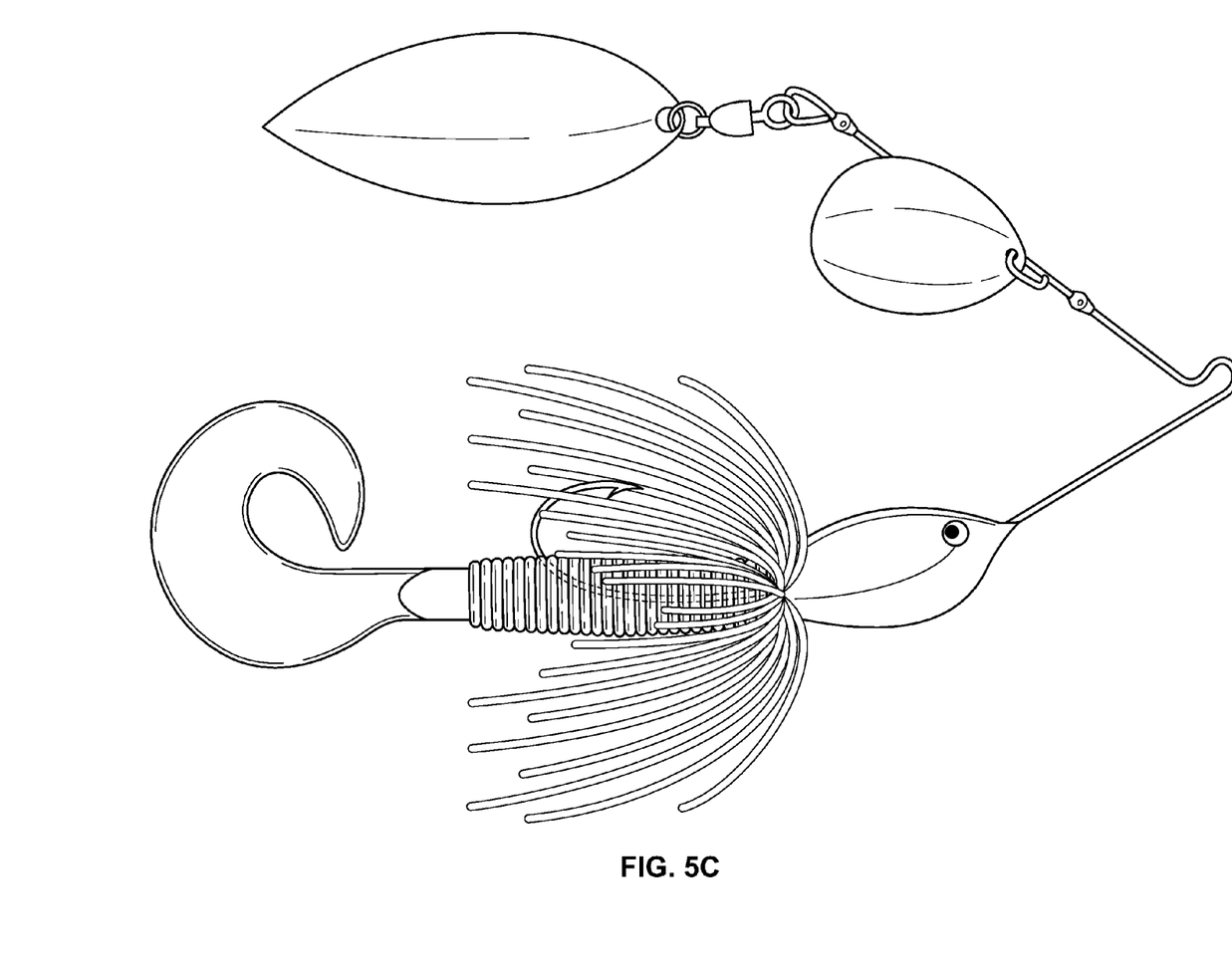
FIG. 5c shows a tail end of a modified, worm-like fishing lure of the present invention rigged as a trailer on a spinner-bait.

Referring now to FIGS. 1-3, the modifiable, worm-like, polymer fishing lure of the present invention comprises a one-piece, integrally-molded, polymer fishing lure body 1 comprising a midsection 2 having a first end 2a and second end 2b, opposing first and second tail ends 3a and 3b, wherein the first tail end 3a is interconnected to the first end 2a of the midsection 2 at a first cutting area 4a and the second tail end 3b is interconnected to the second end 2b of the midsection 2 at a second cutting area 4b, the first and second cutting areas 4a and 4b providing designated locations for modifying the body 1 of the lure such that one or both of the tail ends 3a 3b can be removed to provide: i) two separate polymer fishing lure bodies as shown in FIG. 3; or ii) three separate polymer fishing lure bodies as shown in FIG. 2, wherein each of said polymer fishing lure bodies, whether modified or interconnected can be fished utilizing the same or different angling techniques, for example, as shown in FIGS. 5a-5c.

Figure 4A:
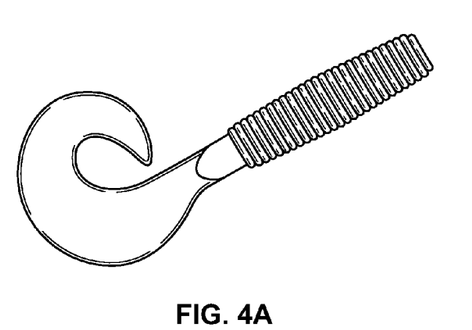
FIGS. 4a-4f show various tail ends of the modifiable, worm-like fishing lure of the present invention.
Figure 4B:
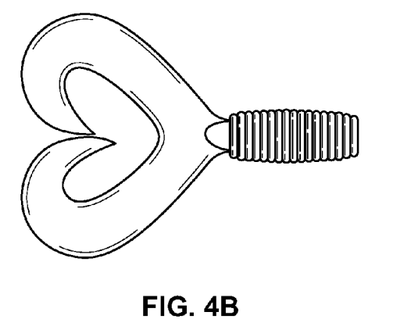
Figure 4C:
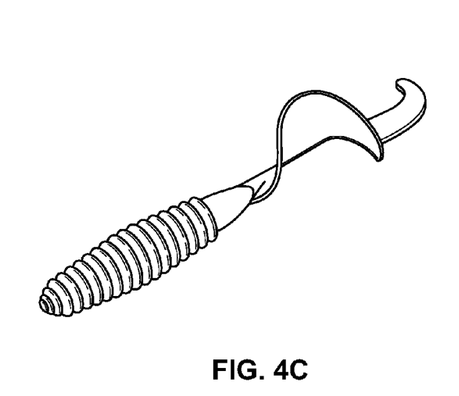
Figure 4D:
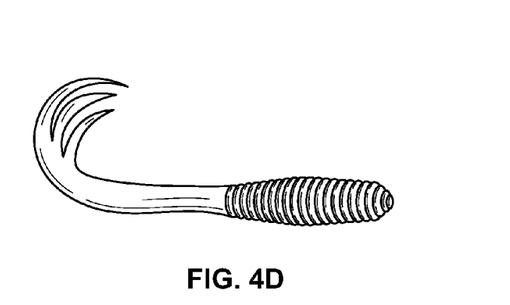
Figure 4E:
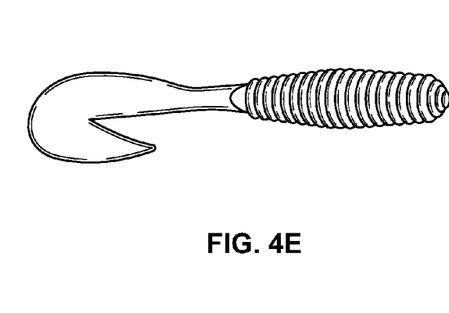
Figure 4F:
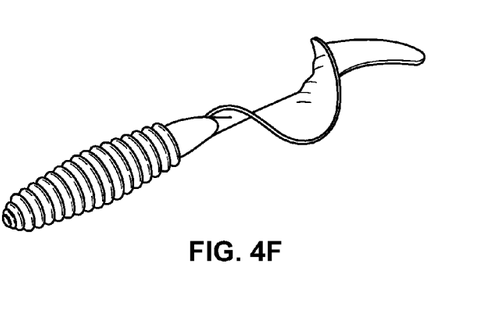

The opposing tail ends 3a 3b may take on any shape or form known in the art that is suitable for providing the bait with a life-like action and increased vibration for attracting fish. For example, in certain embodiments the tail ends 3a 3b may be in the shape of a curly tail (as shown in FIG. 4A), a ribbon tail (as shown FIG. 4F), a sickle tail (as shown in FIG. 4E), a twin tail (as shown in FIG. 4B), a paddle tail, or any combination and variations thereof.

In certain other embodiments the tail ends 3a 3b may contain a plurality of skirt-like appendages. For example, the skirt-like appendages may be in the form of tentacles or thin strands that provide for increased action of the tail ends 3a 3b and increased fish attracting capability.

No matter what type of tail ends 3a 3b are incorporated into the body 1 of the lure, the tail ends 3a 3b should have a length and thickness or diameter such that the portion of the tail ends that interconnects to the first and second ends 2a 2b of the midsection 2 can be properly rigged to a hook or bait when the modifiable, worm-like, polymer fishing lure has been modified for use in various other fishing techniques.

The first and second tail ends 3a 3b of the body 1 may range from about 1 inch to about 4 inches or greater. In certain preferred embodiments, the first and second tail ends 3a 3b range from about 2 inches to about 3 inches in length.

The thickness or diameter of the first and second tail ends 3a 3b may be the same or different than the midsection 2. Preferably, the thickness or diameter of the tail ends 3a 3b are tapered.

The midsection 2 of the fishing lure body 1 may be a rounded body wherein either one or both of the first and second ends 2a 2b are blunt. In certain embodiments, the diameter of the midsection 2 is preferably tapered toward the first and second ends 2a 2b of the midsection and the diameter of the midsection 2 may vary from about 2 mm to about 15 mm, depending on the length of the midsection 2.

The midsection 2 of the body 1 may range from about 2 inches to about 12 inches in length, or greater. In certain preferred embodiments, the midsection 2 of the body 1 ranges from about 3 inches to about 6 inches, and most preferably about 4 inches.

The first and second cutting areas 4a 4b of the modifiable, worm-like fishing lure of the present invention are defined by a point of interconnection between the first and second ends 2a 2b of the midsection and the tail ends 3a 3b. In certain embodiments, the first and second cutting areas 4a 4b are perforations in the body 1 of the lure.

In certain other embodiments, the first and second cutting areas 4a 4b are indentations in the body 1 of the lure.

In yet another embodiment, the first and second cutting areas 4a 4b are further defined by a stamp or mark that is introduced at the designated cutting area after the bait has been molded and cooled. For example, the stamp or mark can be a line created with a marker or ink around the circumference of the lure body at the designated cutting area.

The worm-like, polymer fishing lure of the present invention is capable of being modified such that one or both of the tail ends 3a 3b can be removed to provide: i) two separate polymer fishing lure bodies; or ii) three separate polymer fishing lure bodies, wherein each of said polymer fishing lure bodies, whether modified or interconnected can be fished utilizing the same or different angling techniques.

In certain embodiments of the present invention, the integrally-molded, polymer fishing lure bodies of the present invention may comprise one or more hook slots so as to allow for the placement of a hook. These hook slots are used to allow the hook to lay within the exterior surface of the fishing lure bodies until a fish attempts to swallow the fishing lure body, thereby helping to prevent the hook from being snagged on underwater plants as the fishing lure is being retrieved. A first hook slot may be placed on a top of the midsection and additional hook slots may be placed on the opposing tail ends.

The dimensions of the hook slots are dependent upon the size of the fishing lure body and the size of the hook to be used with the fishing lure body.

The outer surface of the integrally-molded, polymer fishing lure bodies of the present invention may be smooth or contoured. For example, in certain preferred embodiments the outer surface of the integrally-molded, polymer fishing lure bodies may be ribbed.

Materials

The integrally-molded, polymer fishing lure bodies of the present invention may be made from numerous materials known to those of skill in the art of the plastics industry such as, but not limited to, polymers, elastomers and rubbers. For example, the integrally-molded, polymer fishing lure bodies may be made from flexible synthetic resins, such as liquid Plastisol available from numerous manufacturers. Preferred materials may include polymers of propylene, ethylene, and various polymer-based resins.

In certain embodiments, the integrally-molded, polymer fishing lure bodies of the present invention may be made from elastomers such as those described in U.S. Pat. No. 7,266,922, the disclosure of which is hereby incorporated by reference in its entirety.

The hardness of the integrally-molded, polymer fishing lure bodies of the present invention may vary. The durometer is typically used as a measure of hardness in polymers, elastomers and rubbers. Developed in the 1920s by Albert F. Shore, the durometer scale for hardness utilizes slightly different measurement systems (type A and type D scales). The type A scale is for softer plastics, while the type D scale is for harder ones. The integrally-molded, polymer fishing lure bodies of the present invention may have a durometer hardness on the Shore A scale from about 1 to about 20.

Whatever the material and hardness utilized, the integrally-molded, polymer fishing lure bodies of the present invention should be made such that they are generally flexible, pliable, capable of life-like shapes, such as worms, and capable of being modified by an angler. Modification of the bait can be accomplished manually with the use of the angler's hands and fingers or with the use of a tool, such as scissors, a knife, pliers and the like.

Modification of the lure can be accomplished by separating one or both of the tail ends from the midsection at the designated cutting areas 4a 4b (as shown in FIGS. 2 and 3).

The integrally-molded, polymer fishing lure bodies of the present invention may also contain various fish attractants. For example, MegaStrike™ fish attractant can be incorporated into the materials prior to molding to provide additional fish attracting capabilities.

In addition, flecks of sparkle or glitter can be added to the resin to attract fish. Glitter from a craft store is typically used, although synthetic polyester glitter can be used. Gold glitter is a preferred glitter for a red plastic lure.

It is also contemplated that pigments can be added to the materials in at least 100 or more colors. Dyes could be used instead of pigments in liquid plastics. It is also contemplated that other UV stabilizers, fillers and antioxidants can be added to the lure to prevent degradation and reduce costs of manufacture.

Methods of Manufacture

The integrally molded, modifiable, polymer fishing lure of the present invention can be manufactured utilizing various art known techniques. Two popular techniques are hand pouring and injection molding. The difference between the techniques lies in how raw material (heated plastic) enters the mold. Hand pouring, as the name implies, requires extensive manual labor to carefully fill open-cavity molds.

An automated process, injection molding uses machines to perform the work. These machines shoot synthetic plastic into large round two-part molds. These round molds spin to create centrifugal force which pushes the plastic down into the mold, filling all air pockets and cavities as it goes. When the injection process is complete, the round mold pieces are pulled apart, revealing a perfect lure. These lures do not have the flat edges that result from typical 1-piece molds.

Most injection molds comprise halves that mate to define an internal cavity that conforms to the shape of the desired product. The cavity communicates with an injection port and a ventilation port to facilitate the injection process. The thermoplastic material is injected into the injection port and the ventilation port allows the air inside the mold to escape.

A quick inspection of a bait can reveal the technique utilized. Hand-poured plastic bodies have one flat side because they come out of open-cavity molds. They also tend to be more porous than injection-molded plastics, which exhibit a smoother finish. No matter what technique is utilized to manufacture the integrally-molded, modifiable fishing lure bodies of the present invention, the materials utilized must first be processed (melted) such that they can be poured or injected. The plastic may be processed in various ways. For example, one way to process the plastic for pouring or injecting is to first mix the desired amount of plastic material. The mixed material is then poured into a melting pot. The plastic material is then heated to a temperature of about 350° F. and carefully stirred (caution should be used when heating the plastic liquid, and a well ventilated area is required as fumes are produced when the plastic melts causing excessive fumes. Over heating scorches the plastic). As the material heats it will thicken and turn clear. Continue heating and stirring until the plastic is smooth and about the consistency of syrup. Color may be added to the desired shade. Most colors are added to the hot plastic, but fluorescent colors will be brighter if added before the plastic liquid is heated. After color is added, the plastic material is stirred well and then is poured into the desired mold.

Once poured, the lure body is cooled until it is firm and no longer stick to the touch (about a minute or two), then the lure body is pulled from the mold and placed in a pan of cold water to finish cooling. Softener may be added to the melted plastic, but hardener should only be added to the plastic liquid before it is heated. Excess plastic is trimmed off, for example, by rolling over it with a pizza cutter. Alternatively, body of the lure can be trimmed or detailed using a sharp pair of scissors or scalpel.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A modifiable, worm-like, polymer fishing lure for wacky worming, comprising:
  a one-piece, integrally-molded, polymer fishing lure body comprising:
    a midsection having a first end and a second end,
    opposing first and second tail ends, wherein the first tail end is interconnected to the first end of the midsection at a first cutting area and the second tail end is interconnected to the second end of the midsection at a second cutting area, the first and second cutting areas providing a location for modifying the fishing lure body, the first cutting area defining a point of interconnection between the first tail end and the first end of the midsection, the second cutting area defining a point of interconnection between the second tail end and the second end of the midsection, the first and second tail ends being removably connected to the midsection,
    wherein a diameter of the midsection is tapered toward the first and second ends of the midsection,
    wherein a diameter of the first tail end is tapered toward the first end of the midsection and a diameter of the second tail end is tapered toward the second end of the midsection,
    wherein the first and second cutting areas are perforations contained within the fishing lure body,
    wherein the fishing lure body is capable of being modified such that one or both of the tail ends can be removed to provide:
      i) two separate polymer fishing lure bodies; or
      ii) three separate polymer fishing lure bodies, and the midsection when separated from the first and second tail ends is a straight-bodied stick worm lure body,
    wherein each of said polymer fishing lure bodies, whether modified or interconnected can be fished utilizing the same or different angling techniques.

2. The fishing lure of claim 1, wherein the tail ends are identical.

3. The fishing lure of claim 1, wherein the tail ends are different.

4. The fishing lure body of claim 1, wherein the tail ends are selected from the group consisting of curly tail, a ribbon tail, a sickle tail, a twin tail, a paddle tail, or any combinations or variations thereof.

5. The fishing lure of claim 1, wherein the fishing lure body is modified to provide the two separate polymer fishing lure bodies, wherein a first fishing lure body of the two separate polymer fishing lure bodies is a worm-like fishing lure having a tail end selected from the group consisting of a curly tail, a ribbon tail, a sickle tail, a twin tail, or a paddle tail, and a second fishing lure body of the two separate polymer fishing lure bodies is a curly tail grub, a ribbon tail grub, a sickle tail grub, a twin tail grub, or a paddle tail grub.

6. The fishing lure of claim 5, wherein the first and second fishing lure bodies can be fished utilizing any angling technique selected from the group consisting of drop shotting, texas rigging, shaky heading, flick shaking, Carolina rigging, jigging and any combinations thereof.

7. The fishing lure body of claim 5, wherein the second fishing lure body is utilized as a trailer on a different fishing lure.

8. The fishing lure body of claim 7, wherein the second fishing lure body is utilized as the trailer on the different fishing lure body selected from the group consisting of a jig, a spinnerbait, and a buzzbait.

9. The fishing lure of claim 1, wherein the fishing lure body is modified to provide the three separate polymer fishing lure bodies, wherein a first fishing lure body of the three separate polymer fishing lure bodies is a straight-bodied stick worm; a second fishing lure body of the three separate polymer fishing lure bodies is a curly tail grub, a ribbon tail grub, a sickle tail grub, a twin tail grub, or a paddle tail grub, and a third fishing lure body of the three separate polymer fishing lure bodies is a curly tail grub, a ribbon tail grub, a sickle tail grub, a twin tail grub, or a paddle tail grub.

10. The fishing lure of claim 9, wherein the first fishing lure body can be fished utilizing a fishing technique selected from the group consisting of wacky-worming, dead sticking, drop shotting, texas rigging, shaky heading, flick shaking, Carolina rigging, jigging or any combinations thereof and the second and third fishing lure bodies can be fished utilizing any angling technique selected from the group consisting of drop shotting, texas rigging, shaky heading, flick shaking, Carolina rigging, jigging and any combinations thereof.

11. The fishing lure body of claim 9, wherein the second and third fishing lure bodies are utilized as a trailer on a different fishing lure.

12. The fishing lure body of claim 11, wherein the second and third fishing lure bodies are utilized as the trailer on the different fishing lure body selected from the group consisting of a jig, a spinnerbait, and a buzzbait.

13. The fishing lure body of claim 1, wherein the fishing lure body is made of plastisol.

14. The fishing lure body of claim 13, wherein the fishing lure body contains a fish attractant.

15. A modifiable, worm-like, polymer fishing lure for wacky worming, comprising:
  a one-piece, integrally-molded, polymer fishing lure body comprising:
    a midsection having a first end and a second end,
    a first tail end interconnected to the first end of the midsection at a first cutting area, the first cutting area defining a point of interconnection between the first tail end and the first end of the midsection,
    a second tail end interconnected to the second end of the midsection at a second cutting area, the first and second cutting areas providing a location for modifying the fishing lure body, the second cutting area defining a point of interconnection between the second tail end and the second end of the midsection,
    wherein a diameter of the midsection is tapered toward the first and second ends of the midsection,
    wherein a diameter of the first tail end is tapered toward the first end of the midsection and a diameter of the second tail end is tapered toward the second end of the midsection,
    wherein the first and second cutting areas are perforations contained within the fishing lure body,
    the first and second tail ends being respectively removably connected to the midsection at the first and second ends of the midsection and each being selected from the group consisting of a curly tail, a ribbon tail, a sickle tail, a twin tail, a paddle tail, or any combinations thereof, the fishing lure body capable of being modified such that one or both of the tail ends can be removed to provide:

i) two separate polymer fishing lure bodies; or ii) three separate polymer fishing lure bodies, and the midsection when separated from the first and second tail ends is a straight-bodied stick worm lure body, wherein each of said polymer fishing lure bodies, whether modified or interconnected can be fished utilizing the same or different angling techniques.

16. A modifiable, worm-like, polymer fishing lure for wacky worming, comprising:

a one-piece, integrally-molded, polymer fishing lure body comprising:

a midsection having a first end and a second end, a first tail end interconnected to the first end of the midsection at a first cutting area, the first cutting area defining a point of intersection between the first tail end and the first end of the midsection, a second tail end interconnected to the second end of the midsection at a second cutting area, the first and second cutting areas providing a location for modifying the fishing lure body, the second cutting area defining a point of interconnection between the second tail end and the second end of the midsection, wherein a diameter of the midsection is tapered toward the first and second ends of the midsection, wherein a diameter of the first tail end is tapered toward the first end of the midsection and a diameter of the second tail end is tapered toward the second end of the midsection, wherein the first and second cutting areas are perforations contained within the fishing lure body, the first and second tail ends being respectively removably connected to the midsection at the first and second ends of the midsection and each being a curly tail or a sickle tail, the fishing lure body is capable of being modified such that one or both of the tail ends can be removed to provide:

i) two separate polymer fishing lure bodies; or ii) three separate polymer fishing lure bodies, and the midsection when separated from the first and second tail ends is a straight-bodied stick worm lure body, wherein each of said polymer fishing lure bodies, whether modified or interconnected can be fished utilizing the same or different angling techniques.

* * * * *